United States Patent
Vets

(10) Patent No.: US 11,579,306 B2
(45) Date of Patent: *Feb. 14, 2023

(54) DYNAMIC POWER THROTTLING OF SPINNING LIDAR

(71) Applicant: GM Cruise Holdings LLC, San Francisco, CA (US)

(72) Inventor: Robert Vets, Seattle, WA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 16/731,871

(22) Filed: Dec. 31, 2019

(65) Prior Publication Data

US 2021/0096260 A1 Apr. 1, 2021

Related U.S. Application Data

(63) Continuation of application No. 16/586,010, filed on Sep. 27, 2019.

(51) Int. Cl.
*G01S 17/931* (2020.01)
*B60R 1/00* (2022.01)
*G01S 17/89* (2020.01)

(52) U.S. Cl.
CPC .............. *G01S 17/931* (2020.01); *B60R 1/00* (2013.01); *G01S 17/89* (2013.01); *B60R 2300/102* (2013.01); *B60R 2300/301* (2013.01)

(58) Field of Classification Search
None
See application file for complete search history.

(56) References Cited

U.S. PATENT DOCUMENTS

| | | | |
|---|---|---|---|
| 2018/0106890 A1 | 4/2018 | O'Keeffe | |
| 2019/0033879 A1* | 1/2019 | Templeton | G05D 1/024 |
| 2019/0162823 A1* | 5/2019 | Eckstein | G01C 21/28 |
| 2019/0271769 A1 | 9/2019 | Raly et al. | |

OTHER PUBLICATIONS

"International Search Report for PCT Patent Application No. PCT/US2019/068845", dated Jun. 22, 2020, 4 Pages.
"Written Opinion of the International Searching Authority for PCT Patent Application No. PCT/US2019/068845", dated Jun. 22, 2020, 8 Pages.

* cited by examiner

*Primary Examiner* — Rebecca A Volentine
(74) *Attorney, Agent, or Firm* — Calfee, Halter & Griswold LLP

(57) ABSTRACT

An autonomous vehicle having a LIDAR system that scans a field of view is described herein. With more specificity, a computing system of the autonomous vehicle defines a region of interest in the field of view for a scan of the field of view by the LIDAR system. The region of interest is a portion of the field of view. Based on the region of interest, the computing system transmits a control signal to the LIDAR system that causes the LIDAR system to emit first light pulses with a first intensity within the region of interest during the scan and second light pulses with a second intensity outside the region of interest during the scan. The first intensity is different from the second intensity to provide different ranges for distance measurements inside and outside the region of interest.

20 Claims, 7 Drawing Sheets

DYNAMIC POWER THROTTLING OF SPINNING LIDAR

RELATED APPLICATION

This application is a continuation of U.S. patent application Ser. No. 16/586,010, filed on Sep. 27, 2019, and entitled "DYNAMIC POWER THROTTLING OF SPINNING LIDAR". The entirety of this application is incorporated herein by reference.

BACKGROUND

An autonomous vehicle is a motorized vehicle that can navigate without a human driver. An exemplary autonomous vehicle includes a plurality of sensor systems such as, but not limited to, a LIDAR system, a camera system, a global positioning system (GPS), amongst others, wherein the autonomous vehicle is controlled based upon sensor signals output by the sensor systems. The LIDAR system, in particular, can include sets of light emitters and detectors affixed to a rotating platform, wherein the light emitters emit light pulses into a surrounding environment as the platform rotates. The detectors are configured to detect the light pulses upon reflection of the light pulses from one or more objects in the surrounding environment. Based on the detected light pulses, the LIDAR system generates a three-dimensional point cloud that is representative of positions of objects in the environment surrounding the LIDAR system.

As indicated above, an autonomous vehicle operates based upon three-dimensional point clouds output by a LIDAR system that is mounted on or incorporated in the autonomous vehicle. Conventionally, the LIDAR system is configured with a range (a maximum distance from the LIDAR system at which the LIDAR system can detect objects), wherein the range may be a function of, for example, maximum expected velocity of the autonomous vehicle, braking distance of the autonomous vehicle, and so forth. In an example, the range may be approximately 150 meters. To achieve this range, light emitters of the LIDAR system are driven with an amount of power that ensures that each of the light pulses emitted by the light emitters have sufficient intensity to allow for detectors of the LIDAR system to detect the light pulses upon the light pulses reflecting off of an object that is 150 meters away from the LIDAR system.

Driving the light emitters such that this range can be achieved has been observed to cause the light emitters to be subject to overheating, particularly in warmer climates. In addition, as the light emitters emit light pulses with relatively high intensities (to allow for the detectors to detect light reflected off of objects 150 meters from the LIDAR system), light emitted by a light emitter may reflect off of multiple objects prior to being detected by a detector. For instance, light emitted by a light emitter may reflect off of a reflective sign and then reflect off another object in the environment prior to reaching the detector. Because the light reflected off of multiple objects prior to being detected by the detector, a three-dimensional point cloud generated by the LIDAR system based upon the detected light may include inaccuracies.

SUMMARY

The following is a brief summary of subject matter that is described in greater detail herein. This summary is not intended to be limiting as to the scope of the claims.

Described herein are various technologies pertaining to dynamic power throttling of light emitters of a LIDAR system. With more specificity, described herein is an autonomous vehicle comprising a LIDAR system and a computing system that controls the LIDAR system. The computing system defines a region of interest in a field of view of the LIDAR system, wherein the region of interest is a portion of the field of view. The computing system can transmit a control signal to the LIDAR system that causes light emitters of the LIDAR system to emit light pulses of different intensities based upon whether the light pulses correspond to the region of interest. That is, the LIDAR system is configured to emit first light pulses with a first intensity inside the region of interest during a scan of the LIDAR system and second light pulses with a second intensity outside of the region of interest during the scan, wherein the first intensity is different from the second intensity to facilitate provision of different ranges within the scan of the LIDAR system.

The computing system may define a plurality of regions of interest in the field of view for the scan of the LIDAR system. Accordingly, the control signal transmitted to the LIDAR system may further cause the light emitters of the LIDAR system to emit additional light pulses having intensities that are based upon whether the additional light pulses correspond to the plurality of regions of interest and, in some embodiments, to which specific regions of interest the additional light pulses correspond. More specifically, the additional light pulses are emitted from the LIDAR system with an intensity that is different from the intensity of the light pulses emitted outside the region of interest. In embodiments, light pulses emitted in the plurality of regions of interest have the same intensity to facilitate providing a same or similar range for the plurality of regions of interest. In other embodiments, the intensity for the additional light pulses is a third intensity that is different from the first intensity and the second intensity to provide differing ranges for the plurality of regions of interest. In yet another embodiment, the computing system may determine that a region of interest includes a retroreflector (e.g., a shiny surface such as a traffic sign, traffic cone, etc.) that is expected to cause a multi-path return of light pulses to the LIDAR system. In such instances, the control signal transmitted to the LIDAR system can be configured to manipulate the intensity of the light pulses emitted in the region of interest based on a type of the retroreflector located in the region of interest.

Prior to defining the region of interest, the computing system may receive geolocation data that identifies a geolocation of the autonomous vehicle, and the computing system can determine an approximate position of a feature located in the field of view of the LIDAR system based upon the geolocation of the autonomous vehicle. For example, the computing system can store a three-dimensional map of a geographic region, where the three-dimensional map includes locations of stationary objects. Based upon the geolocation of the autonomous vehicle (and orientation of the autonomous vehicle), the computing system can ascertain approximate positions of such stationary objects relative to the autonomous vehicle, and therefore can ascertain the approximate positions of such stationary objects in the field of view of the LIDAR system. Thus, the computing system can ascertain a location of a building, a stop sign, a telephone pole, etc. relative to the autonomous vehicle. The computing system can define the region of interest based upon the known location of an object relative to the autonomous vehicle, such that, for example, the region of interest includes the object. Hence, the region of interest can include a stop sign, and intensity of light pulses can be controlled such that light pulses directed towards the stop sign have lower intensity than light pulses directed elsewhere.

Additionally or alternatively, the computing system may receive a point cloud output by the LIDAR system, wherein the point cloud includes a cluster of points that represent an object that is not identified in the three-dimensional map (e.g., the object is moving or is not a permanent part of the environment). The computing system may then define the region of interest such that the region of interest encompasses the object, and can cause the LIDAR system to emit light pulses towards the region of interest with an intensity that is different from light pulses emitted by the system that are outside of the region of interest. The computing system can update the region of interest over time as a position of the object relative to the autonomous vehicle changes (e.g., due to the autonomous vehicle changing position, the object changing position, or both the autonomous vehicle and the object changing position).

The computing system can define the region of interest by identifying a starting point (such as an approximate location of a centroid of an object in a field of view of the LIDAR system), computing an elevation angle and an azimuth angle for the starting point relative to a baseline elevation angle and a baseline azimuth angle, respectively, and subsequently forming a bounding box that encompasses an object by setting a range of azimuth angles and elevation angles relative to the computed elevation angle and azimuth angle. Hence, the computing system can define a region of interest as having a rectangular profile, wherein the rectangular profile surrounds the region of interest. It is to be understood, however, that the computing system can define a region of interest as having an arbitrarily-shaped enclosed profile, including an ovular profile, a circular profile, a polygonal profile, a shape that approximately corresponds to a profile of an object in the field of view of the LIDAR system, etc.

The technologies described herein exhibit various advantages over conventional LIDAR systems employed in autonomous vehicles. For example, light emitters of the LIDAR system need not be constantly driven with power that causes light pulses emitted by the LIDAR system to have a same intensity. Thus, when the computing system ascertains that a building on the right of the autonomous vehicle is fifteen feet away from the autonomous vehicle, the computing system can control the LIDAR system such that light pulses emitted thereby have lower intensity than light pulses directed in the direction of travel of the autonomous vehicle, thus reducing the possibility that the LIDAR system will overheat. In another example, the computing system can control the LIDAR system such that light pulses directed towards a retroflector have lower intensity than light pulses that are not directed towards a retroreflector, thereby reducing occurrences of light pulses reflecting off multiple objects prior to being detected by the LIDAR system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
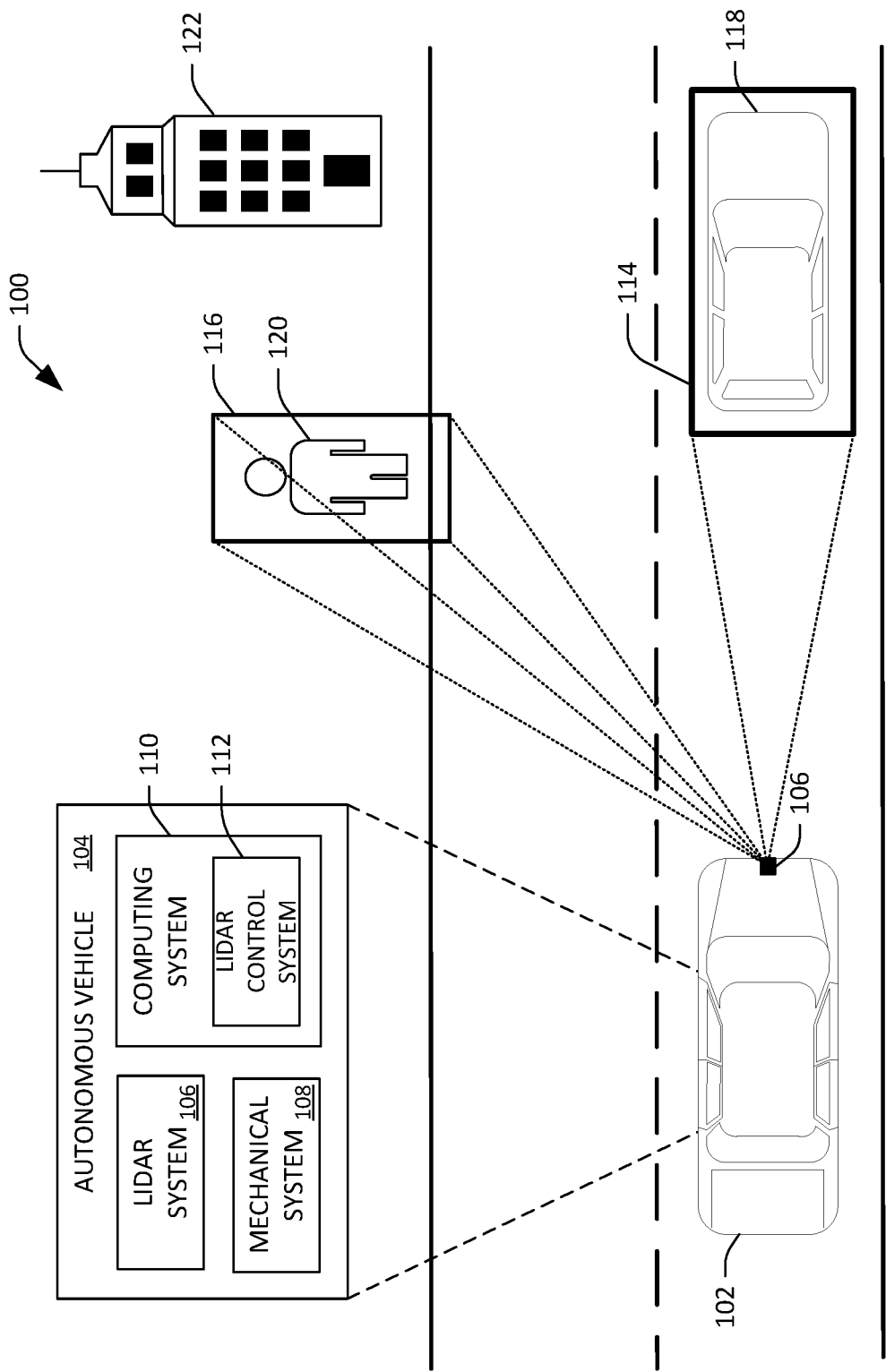
FIG. 1 is a schematic that illustrates an autonomous vehicle having a LIDAR system that emits light pulses with intensities that are based on one or more regions of interest.

Various technologies pertaining to dynamic power throttling of spinning lidar are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean serving as an illustration or example of something and is not intended to indicate a preference.

With reference now to FIG. 1, an exemplary environment 100 is illustrated that includes an autonomous vehicle 102 having a LIDAR system 106 affixed thereto or incorporated therein. The autonomous vehicle 102 includes componentry depicted in call-out 104. Hence, the autonomous vehicle 102 comprises the LIDAR system 106, wherein the LIDAR system 106 emits light pulses into the surrounding environment 100. The LIDAR system 106 may be a spinning LIDAR system, where arrays of light emitters and detectors spin 360 degrees when scanning an environment surrounding the autonomous vehicle 102. In another example, the LIDAR system 106 may be a scanning LIDAR system, wherein the LIDAR system 106 scans less than 360 degrees (e.g., 120 degrees). The autonomous vehicle 102 also comprises a mechanical system 108 (e.g., a vehicle propulsion system, a steering system, a braking system, etc.), and a computing system 110. As described below, the computing system 110 is configured to define one or more non-overlapping regions of interest (114-116) in a field of view of the LIDAR system 106 during a scan of the environment 100 by the LIDAR system 106. Hence, the regions of interest 114-116 are respective portions of the field of view of the LIDAR system 106 for a scan of the LIDAR system 106. The computing system 110 is in communication with the LIDAR system 106 and the mechanical system 108 and controls at least some operations thereof.

With more specificity, the computing system 110 includes a LIDAR control system 112 that transmits a control signal to the LIDAR system 106 based on the one or more regions of interest 114-116, wherein the control signal causes the LIDAR system 106 to emit first light pulses with a first intensity in a first region of interest 114 and second light pulses with a second intensity outside of the first region of interest 114. The first intensity is different from the second intensity, such that the LIDAR system 106 has a first range within the first region of interest 114 and a second range outside the region of interest (e.g., the first range is less than the second range). The LIDAR control system 112 also transmits control signals to the mechanical system 108 based on point clouds received from the LIDAR system 106. A point cloud may include points that represent objects, such as another vehicle 118 or a person 120, within the one or more regions of interest 114-116 as well as other objects, such as a building 122, within the environment 100 (e.g., objects that are outside of the one or more regions of interest 114-116).

In a first non-limiting embodiment, the computing system 110 may define a region of interest in the field of view of the LIDAR system 106 based on: 1) geolocation data that identifies a geolocation of the autonomous vehicle 102; 2) an orientation of the autonomous vehicle 102; and 3) a computer-implemented three-dimensional map of the environment 100. For example, the autonomous vehicle 102 can include a geolocation sensor (such as a GPS sensor) that outputs geolocation data for the autonomous vehicle 102, and the computing system 110 can receive such geolocation data. The computing system 110 can compare the geolocation data with the three-dimensional map to ascertain objects that are in the environment of the autonomous vehicle 102, and can further compare an orientation of the autonomous vehicle 102 with the three-dimensional map to determine approximate positions of the object relative to the autonomous vehicle 102. For example, the computing system 110 can determine that the building 122 is located at a certain position in the field of view of the LIDAR system 106. While not shown, the computing system 110, based upon the approximate location of the building 122 relative to the autonomous vehicle 102 (and thus relative to the LIDAR system 106), can define a region of interest that encompasses the building 122. Such region of interest can be rectangular in shape, ovular in shape, irregular in shape, etc. From the foregoing, it can be ascertained that the computing system 110 can define regions of interest that surround permanent (static) objects in the environment 100 as the autonomous vehicle 102 navigates the environment 100.

When defining a region of interest, the computing system 110 can determine a desired range of the LIDAR system 112 with respect to the region of interest. Continuing with the example set forth above, the computing system 110 can determine that the building 122 is 25 meters from the autonomous vehicle 102 and can therefore set a range of 30 meters for the region of interest that surrounds the building 122.

Range of the LIDAR system 106 is a function of intensity of light pulses that are emitted by light emitters of the LIDAR system 106. For instance, when the light emitters are driven at an upper end of their operating range, the LIDAR system 106 may have a range of 200 meters. In the example set forth above, however, the building 122 is 25 meters from the autonomous vehicle 102, and thus the desired range of the autonomous vehicle for the region of interest that encompasses the building 122 is 30 meters. Continuously driving the light emitters at the upper end of their operating range can cause the light emitters to overheat, particularly in hot climates. The technologies described herein facilitate mitigating overheating of light emitters in the LIDAR system 106, as the computing system 110 defines regions of interest where light emitters can emit light with lower intensity than other regions, such that the light emitters are not continuously driven at the upper end of their operating range. In the example set forth above, the lidar control system 112, for a scan of the LIDAR system 106, causes the computing system 110 to transmit a control signal to the LIDAR system 106. The control signal causes the LIDAR system 106 to emit light pulses in the region of interest surrounding the building with an intensity corresponding to a 30 meter range (rather than a 200 meter range). More specifically, the LIDAR system 106, based upon the control signal, provides a first amount of current to a set of light emitters when the light emitters emit pulses of light in the region of interest during a scan, and provides a second amount of current to the set of light emitters when the light emitters emit pulses of light outside of the region of interest during the scan.

In a second non-limiting embodiment, the computing system 110 can define regions of interest that encompass dynamic objects in the environment 100 (e.g., objects that are capable of moving in the environment 100 or objects that are not permanent in the environment 100). Further, the computing system 110 can define regions of interest to facilitate identifying objects in the regions of interest. For example, steam may be rising from a steam vent in a roadway, wherein conventionally steam has been difficult to disambiguate from some other object (such as a solid mass). In an example, for a first scan, the LIDAR system 106 can emit first light pulses towards the steam that have a first intensity and can output a first point cloud based upon the first light pulses that reflect off the steam and are detected by the LIDAR system 106. The point cloud includes a cluster of points that represents an object that may be steam. The computing system 110 receives the point cloud and ascertains that it is desirable to disambiguate an identity of the object (e.g., it is desirable to determine with a relatively high level of confidence whether the object is or is not steam). The computing system 110 defines a region of interest that surrounds steam in the field of view of the LIDAR system 106 and transmits a control signal to the LIDAR system 106. The control signal is configured to cause the LIDAR system 106 to emit second light pulses towards the steam (in the region of interest) that have a second intensity that is different from the first intensity. The LIDAR system 106 outputs a second point cloud based upon the second light pulses that reflect off the steam and are detected by the LIDAR system 106. The computing system 110 can compare the first point cloud with the second point cloud and based upon densities of points in the point clouds in the region of interest can ascertain that the object is steam. In the case of steam or fog, densities of points corresponding to the steam or fog in two different point clouds will be approximately the same despite light pulses (upon which the point clouds are based) being emitted from the LIDAR system 106 with different intensities. Hence, the computing system 110 can control the LIDAR system 106 to facilitate disambiguation between steam or fog and solid mass.

In another example, the computing system 110 can identify a dynamic object (e.g., a person 120 or another vehicle 118) in the environment 100 based on a point cloud generated by the LIDAR system 106 (and output of other sensors of the autonomous vehicle 102). The computing system 110 is configured to define the region of interest around the object upon identifying the object in the environment 100. In an example, the computing system 110 can be configured to cause the LIDAR system 106 to emit light pulses in the region of interest 116 at higher intensity than light pulses that are directed towards the building 112 (e.g., even when the person 120 is closer to the autonomous vehicle 102 than the building 122), such that detectors of the LIDAR system 106 may detect more light pulses that reflect off the person 120 than would otherwise be detected.

The computing system 110 can define a region of interest for several scans of the LIDAR system 106, wherein position of the region of interest in the field of view of the LIDAR system 106 changes over time. For example, with respect to the vehicle 118, the computing system 110 can define the region of interest 114 as being at a first position (and depth) in a field of view of the LIDAR system 106 for a first scan and can define the region of interest 114 as being at a second position (and depth) in the field of view of the LIDAR system 106 for a second scan. The computing system 110 changes the position of the region of interest 114 due to relative change in position between the autonomous vehicle 102 and the vehicle 118. In another example, a region of interest may track the curvature of the road as the autonomous vehicle 102 navigates along the road. Further, some features such as the curvature of a road may have known characteristics in which geolocation data can provide a basis for repositioning the region of interest in the field of view of the LIDAR system 106.

Figure 2:
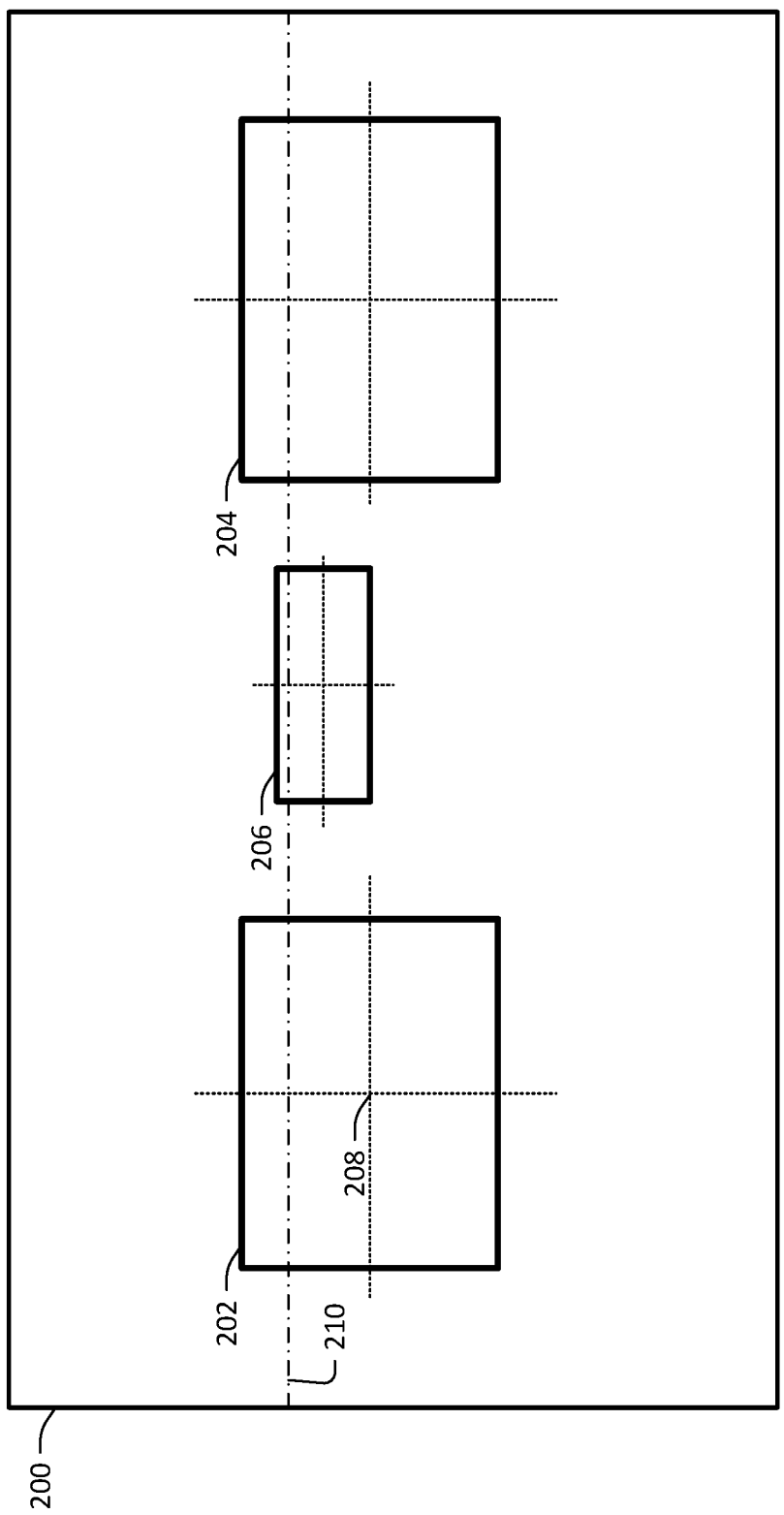
FIG. 2 illustrates and exemplary field of view of a LIDAR system in two-dimensions.

With reference now to FIG. 2, an exemplary field of view 200 of the LIDAR system 106 with respect to a scan is illustrated. The field of view 200 comprises a plurality of regions of interest 202-206 defined by the computing system 110. The plurality of regions of interest 202-206 may each correspond to a respective object included in the field of view 200. It is to be understood that the field of view 200 is not limited to having a specified number of regions of interest, but rather, the number of regions of interest defined in the field of view 200 may be based upon a number of objects in the field of view 200. A control signal transmitted to the LIDAR 106 system causes the LIDAR system 106 to emit first light pulses with a first intensity in the first region of interest 202 in the environment 100 during the scan, emit second light pulses with a second intensity outside of the first region of interest 202 in the environment 100 during the scan, and emit third light pulses with a third intensity in the second region of interest 204 in the environment 100 during the scan, wherein the first intensity is different from the second intensity and the third intensity is different from the second intensity. In another example, the first intensity may be the same as the third intensity.

Still further, the computing system 110 can define the third region of interest 206 in the field of view of the LIDAR system 106, wherein the control signal transmitted to the LIDAR system 106 to emit fourth light pulses with a fourth intensity in the third region of interest 206. The fourth intensity can be different from the second intensity and can be different from or the same as the first intensity and the third intensity. In this manner, the LIDAR system 106 is configured to emit light pulses of different intensities for different regions of interest in a scan of the field of view 200, wherein the plurality of regions of interest 202-206 correspond to different ranges.

The computing system 110 can define the plurality of regions of interest 202-206 through a multi-step process. With respect to the region of interest 202, for example, the computing system 110 can identify a center point 208 of the first region of interest 202 that is to be defined. The center point 208, for example, can be an estimated position of a centroid of a first object in the field of view 200 of the LIDAR system 106. The computing system 110 can estimate the position of the centroid of the first object in the field of view 200 based upon a geolocation of the autonomous vehicle 102, for example, and known location of the object. The object may be a traffic light, a building, a reflective traffic sign, etc. In another example, when the object is not a static object, the centroid of the object in the field of view 200 can be identified based upon: 1) one or more point clouds output by the LIDAR system 106; and 2) optionally sensor signals output by other sensor of the autonomous vehicle 102.

The computing system 110 can ascertain an elevation and azimuth for the center point 208, wherein the elevation and azimuth are relative to a zenith 210 and fixed reference direction, respectively. The computing system 110 computes a range of azimuths and a range of elevations that encompass the object in the field of view 200 (based upon a radial distance between the LIDAR system 106 and the object), and centers such ranges at the center point 208, thereby producing a rectangular region of interest (the region of interest 202). The computing system 110 performs similar actions when defining the regions of interest 204 and 206. It is to be understood, however, that the computing system 110 can define regions of interest as having irregular shape (e.g., such that the region of interest has a profile that corresponds to the profile of the object).

Figure 3:
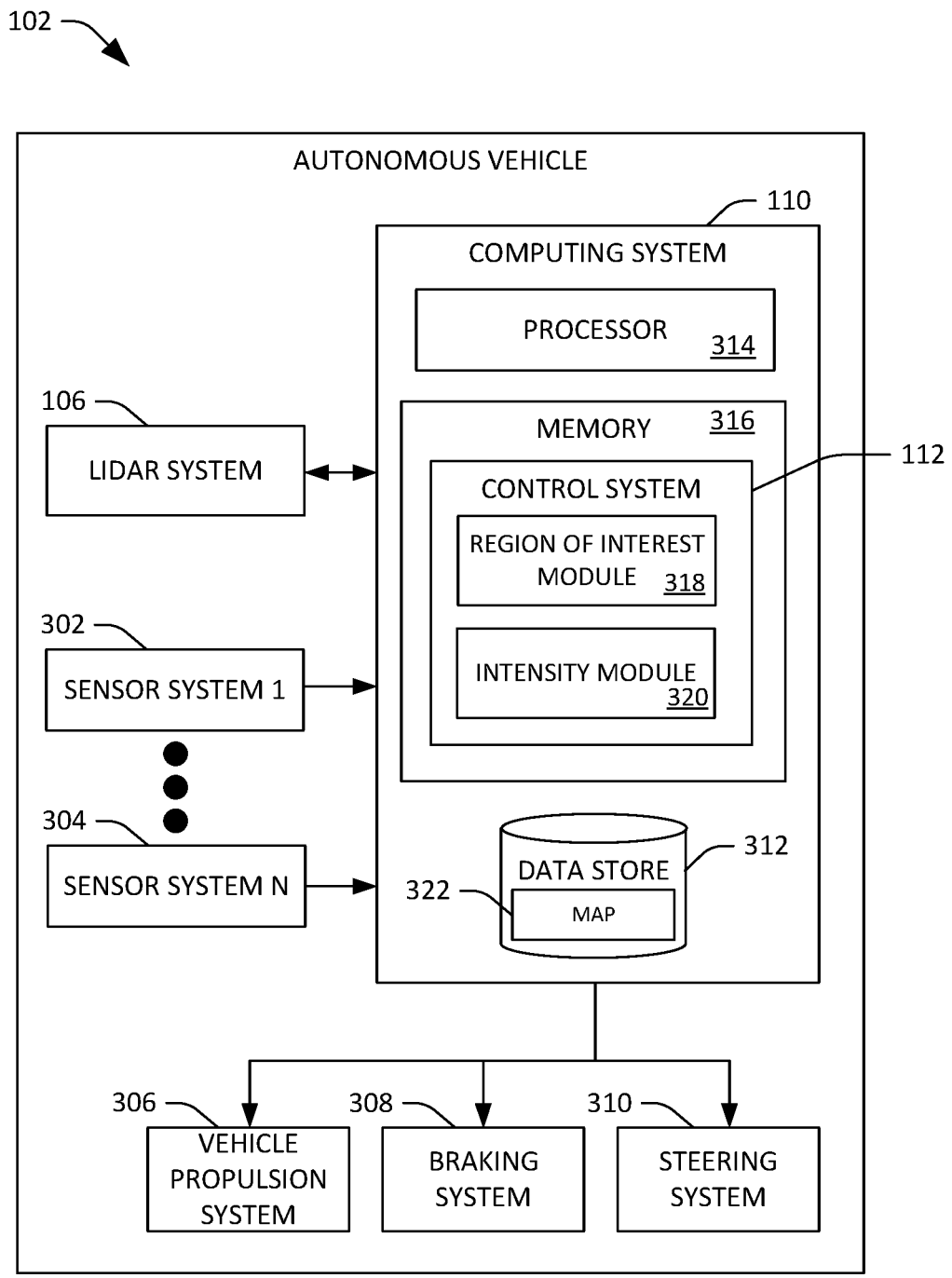
FIG. 3 is a functional block diagram of an exemplary autonomous vehicle.

With reference now to FIG. 3, a functional block diagram of the autonomous vehicle 102 is illustrated. The autonomous vehicle 102 includes the LIDAR system 106 and a plurality of sensor system 302-304. While illustrated as including one LIDAR system, it is to be understood that the autonomous vehicle 102 may optionally include several LIDAR systems. The sensor systems 302-304 can include a camera, a GPS sensor, an accelerometer, an inertial measurement unit, an infrared sensor system, a sonar sensor system, a compass, etc. The autonomous vehicle 102 navigates an environment based on point clouds output by the LIDAR systems 106 and sensor signals output by the sensor systems 302-304.

The autonomous vehicle 102 further includes several mechanical systems that can be used to effectuate motion of the autonomous vehicle 102. For instance, the mechanical systems can include but are not limited to a vehicle propulsion system 306, a braking system 308, and a steering system 310. The vehicle propulsion system 306 may include an electric motor, an internal combustion engine, or both. The braking system 308 can include an engine brake, actuators, and/or any other suitable componentry that is configured to assist in decelerating the autonomous vehicle 102. The steering system 310 includes suitable componentry that is configured to control the direction of movement of the autonomous vehicle 102.

The autonomous vehicle 102 additionally comprises the computing system 110, which is in communication with the LIDAR system 106, the sensor systems 302-304, and the mechanical systems 306-310. The computing system 110 comprises a data store 312 having a three-dimensional, computer-implemented map 322 stored therein, a processor 314, and memory 316 that includes instructions that are executed by the processor 314. In an example, the processor 314 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Memory 316 includes the LIDAR control system 112, wherein the LIDAR control system 112 comprises a region of interest module 318 and an intensity module 320. The region of interest module 318, when executed by the processor 314, defines a region of interest in a field of view of the LIDAR system 106, as described above. The region of interest module 318 defines the region of interest, in an exemplary embodiment, based on locations of objects as identified in the map 322. Additionally or alternatively, the region of interest module 318 defines the region of interest based on one or more point clouds output by the LIDAR system 106 and/or one or more sensor signals output by the sensor systems 302-304.

The intensity module 320, when executed by the processor 314, identifies an intensity of light pulses to be emitted in the field of view of the LIDAR system 106 and, more specifically, an intensity of light pulses to be emitted in the region of interest defined by the region of interest module 318. For instance, the intensity module 320 is configured to ascertain a distance between the LIDAR system 106 and the object that is encompassed by the region of interest, and determine an intensity of light pulses to be emitted by the LIDAR system 106 in the region of interest based upon the distance. In another example, the intensity module 320 can set the intensity of light pulses in the region of interest based upon a type of the object encompassed by the region of interest. For instance, when the object is a stationary trash receptacle, the intensity module 320 can set the intensity of light pulses directed towards the object to be relatively low (e.g., in correspondence to a distance between the LIDAR system 106 and the object). In another example, when the object is a pedestrian, the intensity module 320 can set the intensity of light pulses directed towards the object to be relatively high.

Figure 4:
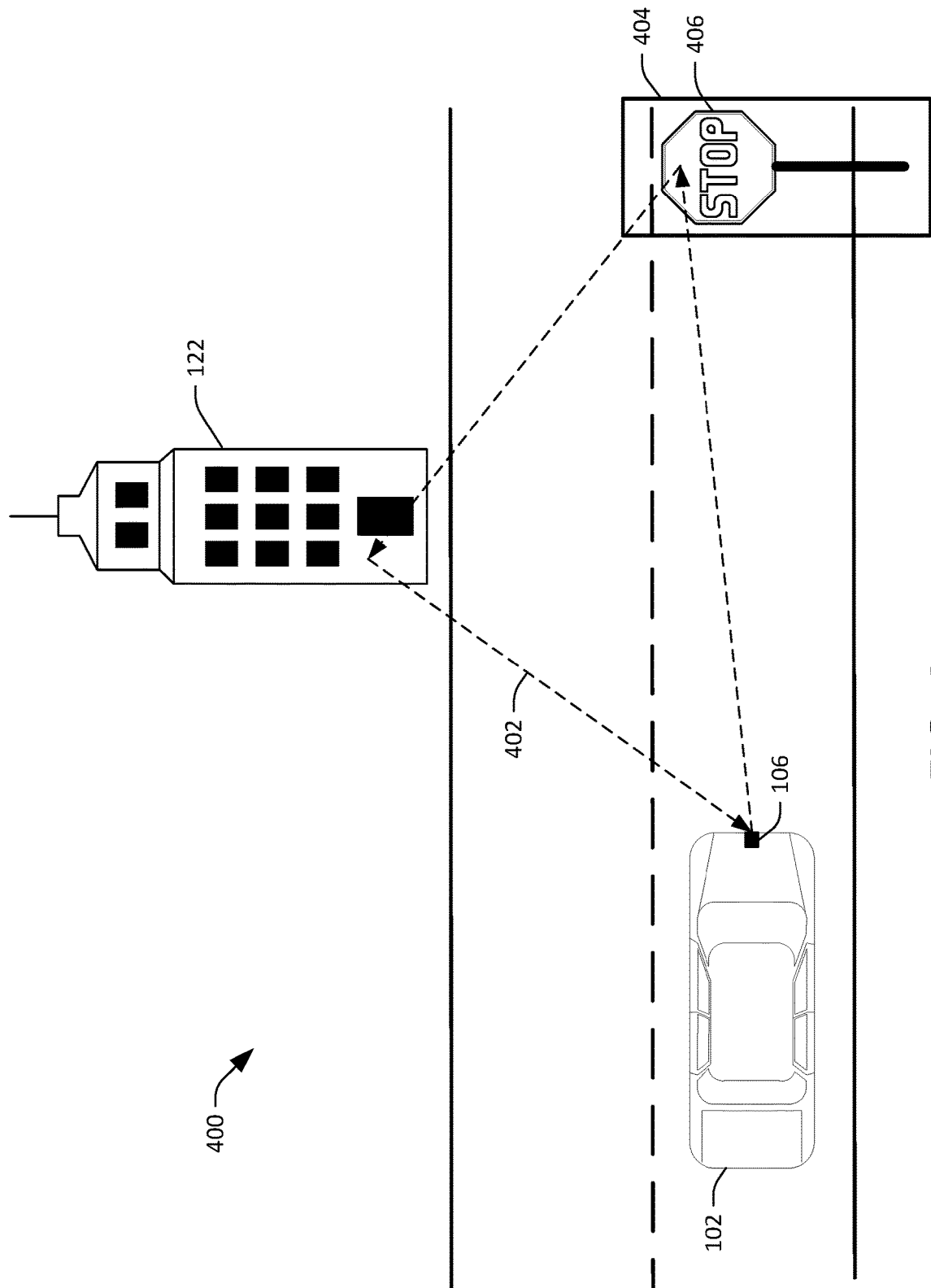
FIG. 4 is a schematic that illustrates a multi-path return of a light pulse to a LIDAR system.

With reference now to FIG. 4, a schematic illustrating the autonomous vehicle 102 navigating in an environment 400 where a pulse of light emitted by the LIDAR system 106 may be subjected to a multi-path return to the LIDAR system 106 is presented. The environment 122 includes the building 122 and a reflective traffic sign 406. Conventionally, a LIDAR system in proximity to the traffic sign 406 emits several pulses of light towards the traffic sign 406. Rather than reflecting from the traffic sign 406 and returning directly to the LIDAR system, one or more of these pulses (represented by reference numeral 402) may reflect off of the traffic sign 406 towards the building 122, and then may reflect off of the building 122 towards the LIDAR system. The one or more pulses are able to "bounce around" in the environment 400 prior to being detected by the LIDAR system due to the LIDAR system emitting relatively high intensity light pulses throughout an entirety of the field of view of the LIDAR system (thereby allowing the LIDAR system to have a desired range in all directions). The LIDAR system may output a point cloud with inaccuracies due to the light pulse being detected after reflecting off of several objects.

The technologies described herein are configured to reduce occurrences of multi-path returns when compared to conventional technologies. With more particularity, the computing system 110 is configured to define a region of interest 404 in the field of view that encompasses the traffic sign 406. It is to be understood that the computing system 110 can define regions of interest that encompass various types of reflective objects, such as traffic cones, advertising signs, etc. The computing system 110 can determine a location of the traffic sign 406 relative to the LIDAR system 106 based upon the map 322 referenced above and a geolocation and orientation of the autonomous vehicle 102 in the environment 400. The computing system 110 defines the region of interest 404 to encompass the traffic sign 406, and further transmits a control signal to the LIDAR system 106 that causes the LIDAR system 106 to emit first light pulses having a first intensity in the region of interest 406 and second light pulses having a second intensity outside of the region of interest. In an example, the first intensity can be less than the second intensity. Further, the first intensity can be selected to correspond to a distance between the LIDAR system 106 and the traffic sign 406, wherein light pulses directed towards the region of interest 404 lack sufficient intensity to "bounce around" the environment prior to being detected by the LIDAR system 106.

Figure 5:
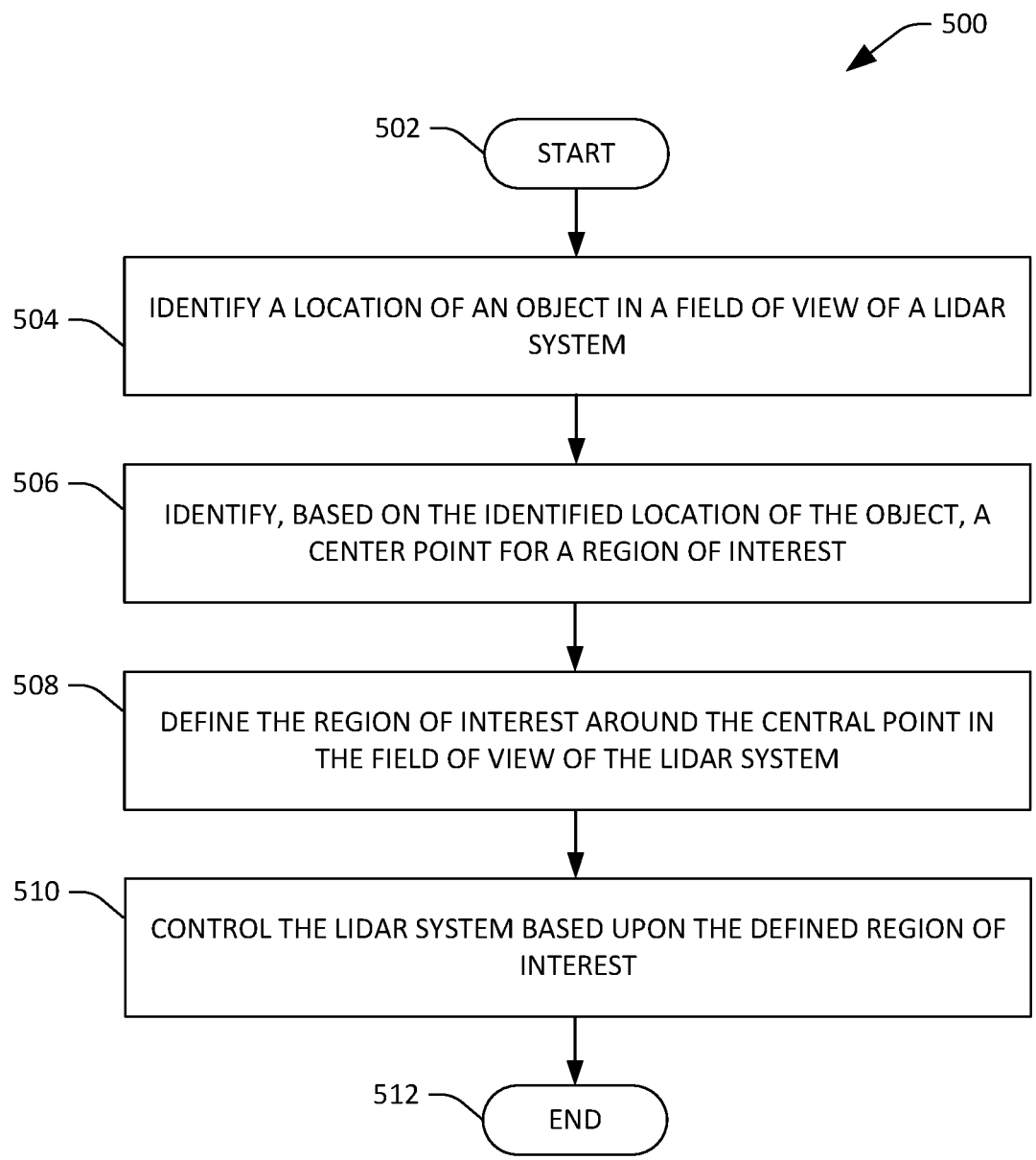
FIG. 5 is a flow diagram illustrating an exemplary methodology for defining a region of interest in a field of view of a LIDAR system.
Figure 6:
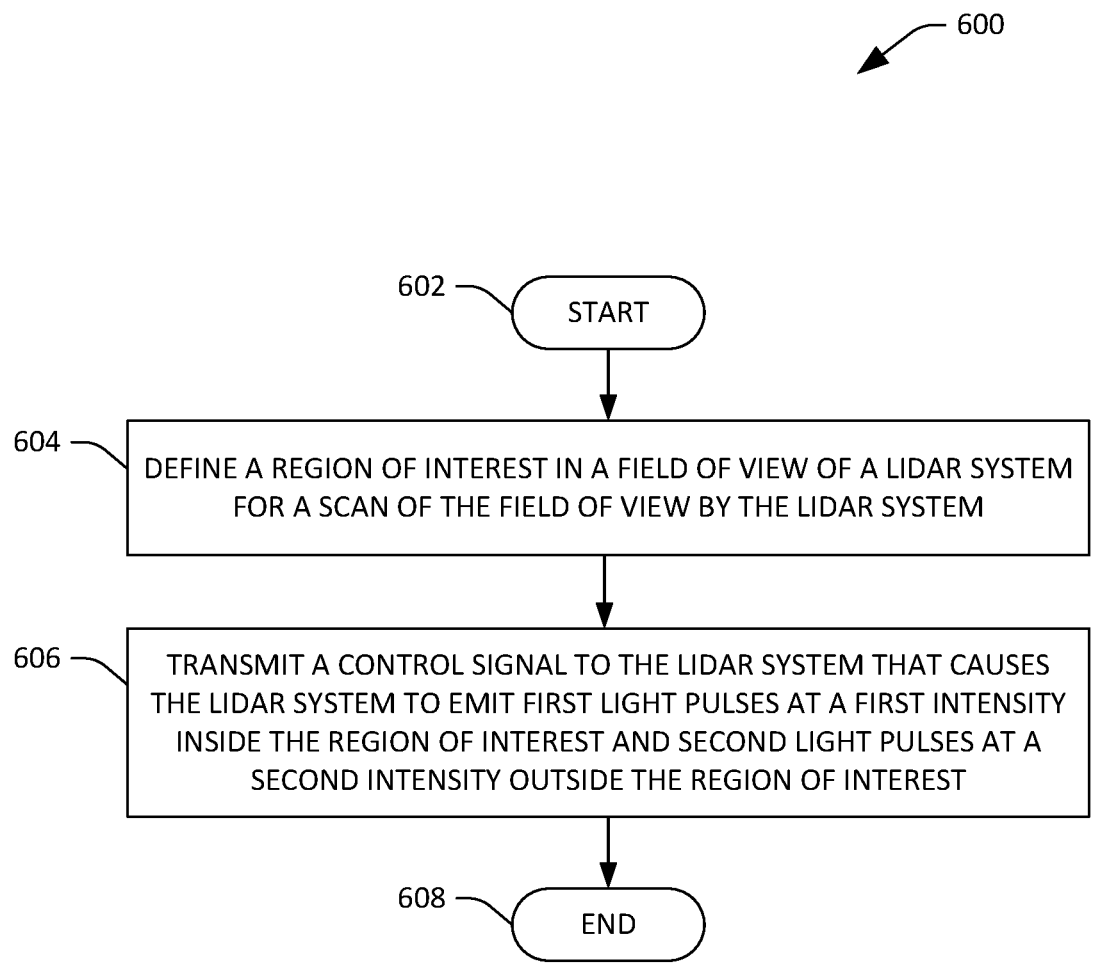
FIG. 6 is a flow diagram illustrating an exemplary methodology for controlling an intensity of light pulses emitted from a LIDAR system.

FIGS. 5-6 illustrate exemplary methodologies relating to defining regions of interest in a field of view of a LIDAR system and for controlling the LIDAR system based upon the regions of interest. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for defining a region of interest in a field of view of a LIDAR system is illustrated. The methodology 500 is performed by the computing system 110 of the autonomous vehicle 102. The methodology 500 starts at 502, and at 504 a location of an object in a field of view of a LIDAR system is identified. The location of the object may be identified in the field of view based upon a perception system executed by the computing system 110, wherein the perception system receives sensor signals output by sensors of the autonomous vehicle and identifies objects based upon such sensor signals. The sensors can include cameras, LIDAR systems, etc. Additionally or alternatively, the location of the object in the field of view may be identified based on a geolocation of the autonomous vehicle, an orientation of the autonomous vehicle, and a known geolocation of the object in an environment of the autonomous vehicle. In another example, the location of the object in the field of view may be identified based upon a point cloud output by the LIDAR system and/or sensor signals output by other sensor systems of the autonomous vehicle 102.

At 506, a center point for the region of interest is identified based on the identified location of the object in the field of view of the LIDAR system. The center point can be identified, for instance, as centroid of the object. Furthermore, the center point can have an azimuth and elevation. At 508, the region of interest is defined based upon the center point. For example, a range of azimuths and elevations that encompasses the object in the field of view of the LIDAR system can be determined and centered on the center point. Additionally or alternatively, the region of interest may comprise a shape that corresponds to a profile of the object. It should be appreciated from the foregoing that determining whether to define a region of interest in the field of view of the LIDAR system may be based on mission-specific preferences and/or requirements of navigation. At 510, the LIDAR system is controlled based upon the defined region of interest. The methodology 500 completes at 512.

Referring now to FIG. 6, an exemplary methodology 600 for controlling an intensity of light pulses emitted from a LIDAR system is illustrated. The methodology 600 can be performed by the computing system 110 of the autonomous vehicle 102. The methodology 600 starts at 602, and at 604 a region of interest is defined in a field of field of view of a LIDAR system for a scan of the field of view by the LIDAR system. The region of interest comprises a portion of the field of view of the LIDAR system. At 606, based upon the region of interest, a control signal is transmitted to the LIDAR system that causes the LIDAR system to emit first light pulses with a first intensity in the region of interest during the scan and second light pulses with a second intensity outside the region of interest during the scan, such that the LIDAR system has a first range for the region of interest and a second range outside the region of interest. The methodology 600 completes at 608.

Figure 7:
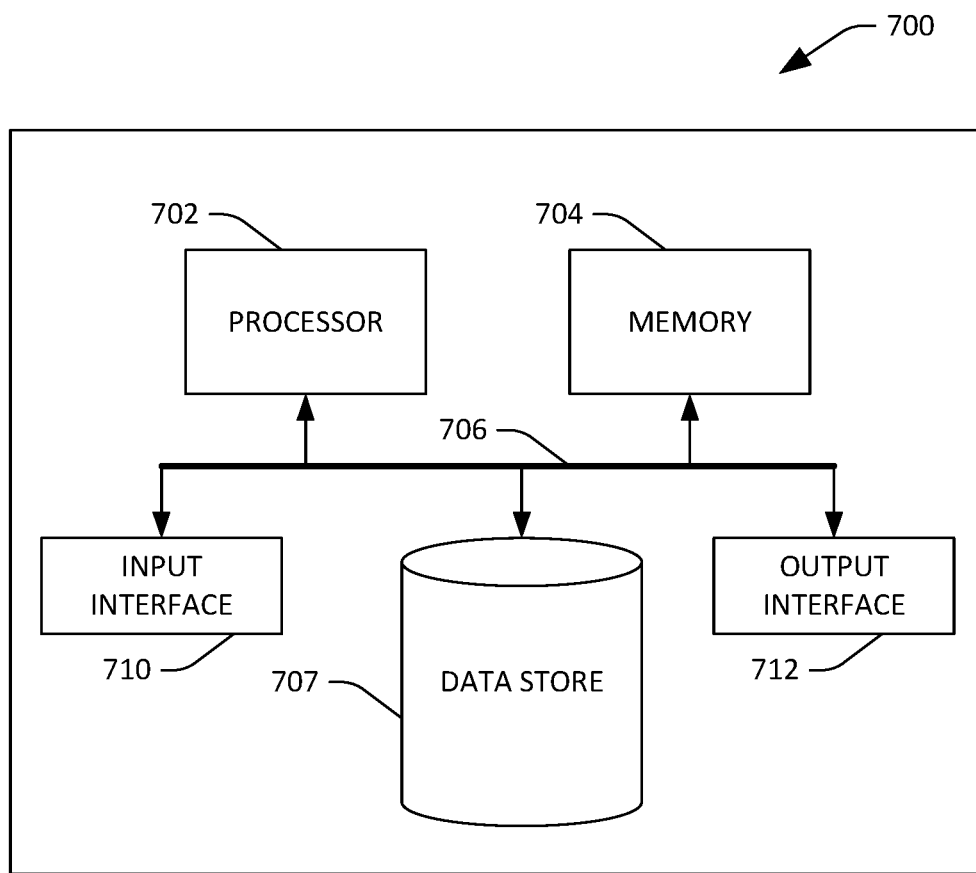
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 110. The computing device 700 includes at least one processor 702 that executes instructions that are stored in a memory 704. The instructions may be, for instance, instructions for implementing functionality described as being carried out by one or more modules discussed above or instructions for implementing one or more of the methods described above. The processor 702 may access the memory 704 by way of a system bus 706. In addition to storing executable instructions, the memory 704 may also store geospatial data of objects, a map of an environment, etc.

The computing device 700 additionally includes a data store 708 that is accessible by the processor 702 by way of the system bus 706. The data store 708 may include executable instructions, geolocation data, a map of an environment, and the like. The computing device 700 also includes an input interface 710 that allows external devices to communicate with the computing device 700. For instance, the input interface 710 may be used to receive instructions from an external computing device, from a user, etc. The computing device 700 also includes an output interface 712 that interfaces the computing device 700 with one or more external devices. For example, the computing device 700 may transmit control signals to the LIDAR system 106, the vehicle propulsion system 206, the braking system 208, and/or the steering system 210 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
    a LIDAR system; and
    a computing system in communication with the LIDAR system, wherein the computing system defines a region of interest to include a stationary object at a location specified in a computer-implemented three-dimensional map of an environment, wherein the computing system determines a distance between the LIDAR system and the stationary object in the environment based on geolocation data that identifies a location of the autonomous vehicle and the location of the stationary object specified in the computer-implemented three-dimensional map, and wherein the LIDAR system is configured to perform acts comprising:
        receiving a control signal from the computing system;
        based upon the control signal and during a scan of the environment by the LIDAR system:
            emitting first light pulses with a first intensity in the region of interest defined by the computing system, the region of interest being a portion of a field of view of the LIDAR system, the first intensity being set to control a range of the LIDAR system based on the distance between the LIDAR system and the stationary object in the environment;
            emitting second light pulses with a second intensity outside of the region of interest, wherein the first intensity is different from the second intensity; and
            generating a return based upon the emitted first light pulses and the emitted second light pulses, wherein the return indicates distances between the LIDAR system and objects in the environment.

2. The autonomous vehicle of claim 1, wherein the geolocation data is received from a geolocation sensor.

3. The autonomous vehicle of claim 1, wherein the stationary object is identified in the three-dimensional map as being a reflective object, and further wherein the region of interest is defined to surround the reflective object.

4. The autonomous vehicle of claim 3, wherein the first intensity is lower than the second intensity.

5. The autonomous vehicle of claim 1, the acts performed by the LIDAR system further comprising:
    based upon the control signal and during the scan of the environment by the LIDAR system, emitting third light pulses with a third intensity in a second region of interest defined by the computing system, wherein the second region of interest is non-overlapping with the region of interest, and further wherein the third intensity is different from the first intensity and the second intensity.

6. The autonomous vehicle of claim 5, wherein the computing system, prior to defining the second region of interest, identifies a location of an object in a field of view of the LIDAR system, wherein the computing system identifies the location of the object based upon a point cloud output by the LIDAR system prior to performing the scan, wherein the computing system defines the second region of interest based upon the location of the object in the field of view of the LIDAR system.

7. The autonomous vehicle of claim 6, wherein the computing system defines the second region of interest to surround the object in the field of view of the LIDAR system.

8. The autonomous vehicle of claim 7, wherein the third intensity is greater than the second intensity.

9. The autonomous vehicle of claim 6, the acts performed by the LIDAR system further comprising:
    during a subsequent scan of the LIDAR system and based upon the second region of interest, emitting fourth light pulses with a fourth intensity in the second region of interest defined by the computing system, wherein the fourth intensity is different from the third intensity; and
    disambiguating whether the object in the second region of interest is at least one of steam or fog based on the return corresponding to the scan and a subsequent return corresponding to the subsequent scan.

10. The autonomous vehicle of claim 1, wherein the region of interest has a rectangular profile.

11. The autonomous vehicle of claim 1, wherein the region of interest has an irregular profile.

12. The autonomous vehicle of claim 1, wherein the region of interest is updated over time as the location of the stationary object changes relative to the location of the autonomous vehicle.

13. A method performed by an autonomous vehicle, the method comprising:
    by a computing system of the autonomous vehicle:
        defining a region of interest to include a stationary object at a location specified in a computer-implemented three-dimensional map of an environment; and
        determining a distance between a LIDAR system of the autonomous vehicle and the stationary object in the environment based on geolocation data that identifies a location of the autonomous vehicle and the location of the stationary object specified in the computer-implemented three-dimensional map;
    by the LIDAR system of the autonomous vehicle, during a scan of the LIDAR system, and based upon a control signal received from the computing system of the autonomous vehicle:
        emitting first light pulses with first intensity in the region of interest defined by the computing system of the autonomous vehicle, wherein the region of interest is a portion of a field of view of the LIDAR system, the first intensity being set to control a range of the LIDAR system based on the distance between the LIDAR system and the stationary object in the environment; and
        emitting second light pulses with second intensity outside of the region of interest, wherein the first intensity is different from the second intensity;
    by the LIDAR system, generating a return based upon the emitted first light pulses and the emitted second light pulses, wherein the return includes values that are indicative of distances between the LIDAR system and objects in the field of view of the LIDAR system; and
    navigating a roadway based upon the return generated by the LIDAR system.

14. The method of claim 13, wherein the LIDAR system is a spinning LIDAR system that has a 360 degree horizontal field of view.

15. The method of claim 13, wherein the LIDAR system is a scanning LIDAR system that has less than a 360 degree horizontal field of view.

16. The method of claim 13, further comprising:
    by the computing system:
        identifying a type of the stationary object in the field of view of the LIDAR system; and
        defining the region of interest based upon the type of the stationary object in the field of view of the LIDAR system.

17. The method of claim 16, wherein the type of the stationary object is a reflective traffic sign.

18. An autonomous vehicle comprising:
a LIDAR system; and
a computing system that is configured to perform acts comprising:
 defining a region of interest to include a stationary object at a location specified in a computer-implemented three-dimensional map of an environment; and
 determining a distance between a LIDAR system of the autonomous vehicle and the stationary object in the environment based on geolocation data that identifies a location of the autonomous vehicle and the location of the stationary object specified in the computer-implemented three-dimensional map;
wherein the LIDAR system is configured to perform acts comprising:
 during a scan of the LIDAR system, and based upon a control signal received from the computing system of the autonomous vehicle:
  emitting first light pulses with first intensity in a region of interest defined by the computing system of the autonomous vehicle, wherein the region of interest is a portion of a field of view of the LIDAR system, wherein the first intensity is set to control a range of the LIDAR system based on the distance between the LIDAR system and the stationary object in the environment; and
  emitting second light pulses with second intensity outside of the region of interest, wherein the first intensity is different from the second intensity;
 generating a return based upon the emitted first light pulses and the emitted second light pulses, wherein the return includes values that are indicative of distances between the LIDAR system and objects in the field of view of the LIDAR system, and further wherein the autonomous vehicle is configured to navigate a roadway based upon the return.

19. The autonomous vehicle of claim 18, wherein the LIDAR system is a spinning LIDAR system.

20. The autonomous vehicle of claim 18, wherein the LIDAR system is a scanning LIDAR system.

* * * * *